March 7, 1939. J. V. PAGLIARONI 2,149,898
VALVE LUBRICATING SYSTEM
Filed Oct. 29, 1936
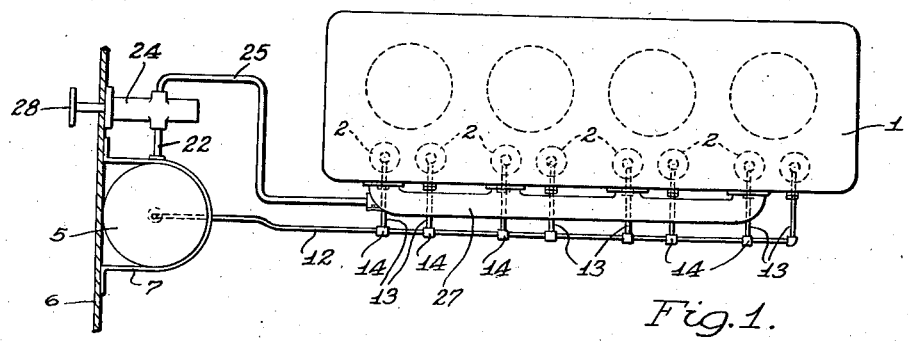
Fig.1.
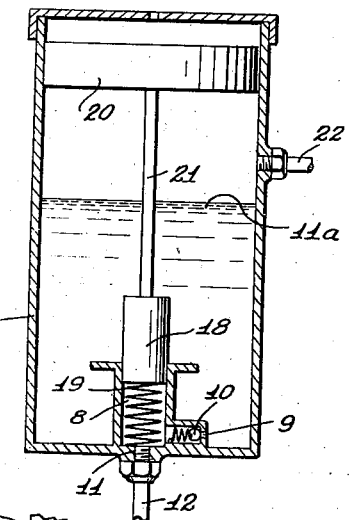
Fig.3.
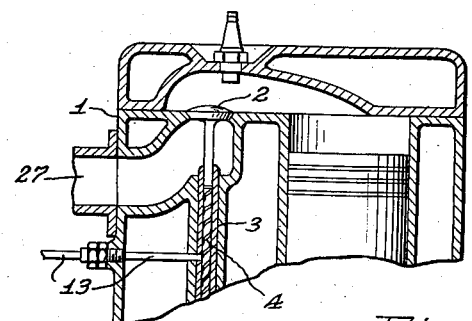
Fig.2.
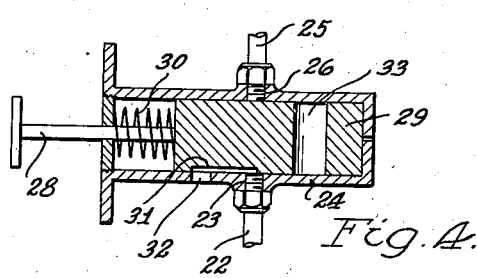
Fig.4.
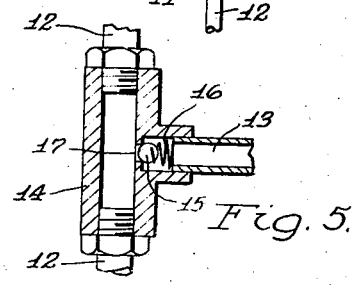
Fig.5.
INVENTOR
John V. Pagliaroni
BY
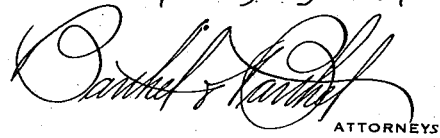
ATTORNEYS Patented Mar. 7, 1939

2,149,898

UNITED STATES PATENT OFFICE 2,149,898

VALVE LUBRICATING SYSTEM

John V. Pagliaroni, Clawson, Mich., assignor of one-half to Mildred A. Hund, Grosse Pointe Park, Mich., and one-fourth to Joseph Halter, Detroit, Mich.

Application October 29, 1936, Serial No. 108,143

7 Claims. (Cl. 184—6)

The present invention relates to apparatus for lubricating the valves of internal combustion engines and has for its primary object to provide means for supplying lubricant under pressure to the several valves of an engine simultaneously, the means being so constructed and arranged that it may be conveniently actuated by the operator of a vehicle when such lubrication is deemed necessary.

Another object of the invention is to provide a lubricating system for the intake and exhaust valves of internal combustion engines, and more particularly, the valves of engines such as are used in automotive vehicles. With this end in view the invention provides a pressure device designed for support on the engine side of the bulkhead or dash of a vehicle and manual means disposed on the inner side of the bulkhead, where it is convenient to the vehicle operator, for actuating the pressure device for supplying a measured amount of lubricant to the valves of the engine.

Another object of the invention is to provide a lubricating system of the character referred to above wherein the pressure device is actuated by suction and is connected to the intake manifold of the engine for actuation by the suction present therein. The invention also provides a valve for controlling communication between the source of suction and the pressure device so that the latter may be operated conveniently by the operator of a vehicle.

With the above and other ends in view the invention is more fully disclosed with reference to the accompanying drawing, in which—

Figure 1 is a plan view of the system connected with an internal combustion engine;

Fig. 2 is a fragmental section illustrating the connection with the valve guide;

Fig. 3 is a vertical section of the pressure device;

Fig. 4 is a section of the control valve; and

Fig. 5 is a section illustrating a detail.

Like characters of reference are employed throughout to designate corresponding parts.

The numeral 1 designates an internal combustion engine having the usual valves 2 for controlling the intake of fuel and the exhaust of burned gases. As shown in Fig. 2 the valves are usually mounted in guides 3 for reciprocation by cams (not shown) on the cam shaft of the engine. The structure here shown is by way of example only and is intended to illustrate the applicability of the present lubricating system to any of the various known types of internal combustion engines. It is preferred, however, that the valve stems be provided with spiral oil grooves as shown at 4 in Fig. 2.

A cylindrical container 5, adapted to be mounted upon the dash 6 of an automotive vehicle by a bracket 7, has a pump chamber 8 formed in the bottom thereof. The inlet port 9 to the pump chamber 8 is controlled by a check valve 10, the check valve functioning to permit oil or fluid lubricant 11a, contained in the container 5, to enter the pump chamber 8 through the port 9 and to prevent it from flowing out of the chamber 8 through the port 9. The outlet port 11 of the pressure chamber 8 has a pipe line 12 connected thereto, the latter extending alongside the engine 1 and having a plurality of branches 13 connected thereto. One of the branches 13 extends to the guide 3 of each of the valves 2.

Between each branch line 13 and the main pipe line is a fitting 14 and each fitting contains a ball check 15 with a spring 16 normally seating it on the port 17 between the main pipe line 12 and its respective branch 13. It is obvious, upon reference to Fig. 5, that in order for the lubricant to flow from the main pipe line 12 to the branch line 13 that the lubricant must be under sufficient pressure to compress the spring 16.

Mounted in the pressure chamber 8 is a plunger 18 and a spring 19 normally urging the plunger 18 upwardly. A piston 20 is slidably mounted in the container 5 and is connected to the plunger 18 by a rod 21. Connected to the container 5 at a point above the level of the lubricant 11 is a pipe line 22 which is connected with a port 23 in a valve body 24. A pipe line 25 is connected at one end to the port 26 in the valve body 24 and to the intake manifold 27 of the engine 1. The valve body 24 is mounted upon the dash 6 and has an operating handle 28 extending through the dash, the other end of the handle 28 being connected to a valve plug 29 in the valve body 24. The valve plug 29 is normally held in the position shown in Fig. 4 by a spring 30 and when in the position shown a duct 31 provides communication between the port 23 and a port 32 which opens to the atmosphere. The valve plug 29 has a port 33 extending therethrough and adapted, upon movement of the valve plug 29 to the left as viewed in Fig. 4, to connect the two ports 23 and 26.

In describing the operation of the present lubricating system it will be assumed that the engine 1 is operating and that a partial vacuum is present in the intake manifold 27. The operator, in order to lubricate the valves pulls the handle 28 outwardly and moves the port 33 in the valve plug into register with the two ports 23 and 26. The interior of the container 5 is thus placed in communication with the intake manifold 27 and a partial vacuum is created within the container beneath the piston 20. Atmospheric pressure then acts upon the piston 20 to force the same downwardly and to cause movement of the plunger 18 in the pressure chamber 8. Lubricant is thus expelled from the chamber 8 into the main pipe line 12 and when the pressure on the lubricant is sufficient to open the valves 15, the lubricant flows through the branch lines to the valves 2. The valves 15, in checking the flow of lubricant until a predetermined minimum pressure has been built up, cause the flow to the several valves to be uniform. In other words, the valves 2 which are farthest remote from the pressure device receive as much lubricant as the other valves.

When the handle 28 is released the spring 30 restores the valve plug to its original position and air at atmospheric pressure enters the container 5 through the port 32, duct 31 and pipe line 22 to dissipate the partial vacuum therein. The spring 19 forces the plunger 18 and piston upwardly and during such movement lubricant is drawn into the pressure chamber 8 and the device is in position for subsequent actuation.

Although a specific embodiment of the present invention has been illustrated and described it will be understood that various changes may be made within the scope of the appended claims without departing from the spirit of the invention, and such changes are contemplated.

What I claim is:

1. Lubricating apparatus for an automotive vehicle having an engine with an intake manifold providing a source of suction, comprising a cylindrical container adapted to contain a quantity of lubricant, a pump chamber within said container having a check valve controlled inlet opening into said container and an outlet adapted to be connected to elements to be lubricated, a piston slidable in said container, a plunger slidable in said chamber and connected to said piston for actuation thereby, spring means for moving said plunger and piston in a direction to draw lubricant from the container into said chamber, means for connecting the container on one side of said piston with the source of suction or with the atmosphere selectively, and means on the other side of said piston constantly connecting the container with the atmosphere.

2. Lubricating apparatus for an automotive vehicle having an engine with an intake manifold providing a source of suction, comprising a cylindrical container disposed with its axis vertical, said container being adapted to contain lubricant, a pump chamber in the bottom of said container co-axial therewith, said chamber having a check valve controlled inlet opening into said container and an outlet adapted to be connected to elements to be lubricated, a piston slidable in said container above the lubricant contained therein, a plunger slidable in said chamber, means connecting said plunger to said piston for actuation thereby, spring means for moving said plunger in a direction to draw lubricant from said container into said chamber, and means for connecting said container beneath said piston with said source of suction or with the atmosphere selectively, said container having a port above said piston providing constant communication with the atmosphere.

3. Lubricating apparatus for an automotive vehicle having an engine with an intake manifold providing a source of suction, comprising a cylindrical container disposed with its axis vertical, a pump chamber disposed on the bottom wall of said container and extending vertically into the container, said container being of a diameter substantially greater than said chamber and of a length substantially greater than said chamber, said container being adapted to contain lubricant at a level higher than said chamber, said chamber having a check valve controlled inlet opening into said container and an outlet adapted to be connected to elements to be lubricated, spring means for moving said plunger in a direction to charge said chamber with lubricant, and means for connecting said container with said source of suction or the atmosphere selectively at a point therein above the lubricant level and beneath said piston, said container having a port above said piston providing constant communication with the atmosphere.

4. Lubricating apparatus for an automotive vehicle having an engine with an intake manifold providing a source of suction, comprising a cylindrical container adapted to contain a quantity of lubricant, a pump chamber within said container having a check valve controlled inlet opening into said container and an outlet adapted to be connected to elements to be lubricated, a piston slidable in said container, a plunger slidable in said chamber and connected to said piston for actuation thereby, spring means for moving said plunger and piston in a direction to draw lubricant from the container into said chamber, means for connecting the container on one side of said piston with the source of suction or with the atmosphere selectively, said suction connecting means having a manual control operable to connect the container with the source of suction, spring means normally holding the control in a position to connect the container with the atmosphere, and means on the other side of said piston constantly connecting the container with the atmosphere.

5. Lubricating apparatus for an automotive vehicle having an engine with an intake manifold providing a source of suction, comprising a cylindrical container disposed with its axis vertical, said container being adapted to contain lubricant, a pump chamber in the bottom of said container co-axial therewith, said chamber having a check valve controlled inlet opening into said container, and an outlet adapted to be connected to elements to be lubricated, a piston slidable in said container above the lubricant contained therein, a plunger slidable in said chamber, means connecting said plunger to said piston for actuation thereby, spring means for moving said plunger in a direction to draw lubricant from said container into said chamber, means for connecting said container beneath said piston with said source of suction or with the atmosphere selectively, said suction connecting means having a manual control operable to connect the container with the source of suction, and spring means normally holding the control in a position to connect the container with the atmosphere, said container having a port above said piston providing constant communication with the atmosphere.

6. Lubricating apparatus for an automotive vehicle having an engine with an intake manifold providing a source of suction, comprising a cylindrical container disposed with its axis vertical, a pump chamber disposed on the bottom wall of said container and extending vertically into the container, said container being of a diameter substantially greater than said chamber and of a length substantially greater than said chamber, said container being adapted to contain lubricant at a level higher than said chamber, said chamber having a check valve controlled inlet opening into said container and an outlet adapted to be connected to elements to be lubricated, spring means for moving said plunger in a direction to charge said chamber with lubricant, means for connecting said container with said source of suction or the atmosphere selectively at a point therein above the lubricant level and beneath said piston, said suction connecting means having a manual control operable to connect the container with the source of suction, and spring means normally holding the control in a position to connect the container with the atmosphere, said container having a port above said piston providing constant communication with the atmosphere.

7. Lubricating apparatus for a motor vehicle having an engine including an intake manifold providing a source of subatmospheric pressure comprising, a reservoir for lubricant and connected above the level of the lubricant therein to the engine intake manifold, means providing a chamber in said reservoir having an inlet communicating with said reservoir and having an outlet, pressure responsive valve means controlling said inlet, a piston having a relatively large piston portion in and cooperable with said reservoir and continuously subjected on one side thereof to atmospheric pressure, said piston having a relatively small piston portion in said chamber movable in one direction to discharge lubricant therefrom, spring means opposing movement of said piston in said one direction, and means to control the establishing of subatmospheric pressure in said reservoir.

JOHN V. PAGLIARONI.